United States Patent Office 3,446,725
Patented May 27, 1969

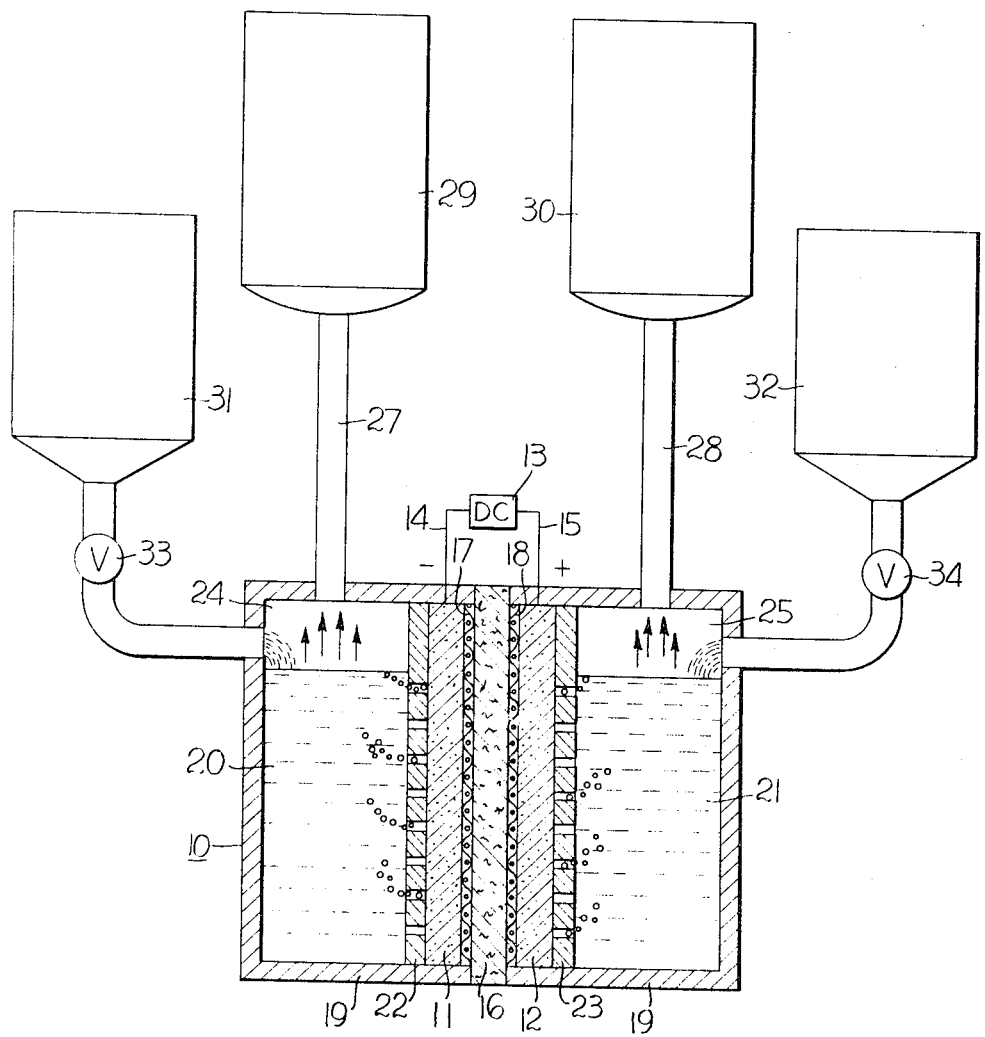

3,446,725
ELECTROLYSIS CELL
Harold H. Spengler, Waukesha, and Thomas J. Kempher, Milwaukee, Wis., assignors to Allis-Chalmers Manufacturing Company, Milwaukee, Wis.
Filed Feb. 25, 1966, Ser. No. 530,163
Int. Cl. C01b 13/06; B01k 3/10
U.S. Cl. 204—242
6 Claims

ABSTRACT OF THE DISCLOSURE

An electrolysis cell for the preparation of hydrogen and oxygen, in which a noble metal screen substrate is interposed between the electrode and electrolyte matrix interfaces.

---

This invention relates to improvements in process and apparatus for effecting electrolysis. More particularly, the present invention relates to an electrolytic cell apparatus for the production of oxygen and hydrogen from aqueous electrolyte solutions.

In the electrolysis of water for the production of hydrogen and oxygen, a direct current is passed through an aqueous alkaline electrolyte, usually a solution of caustic soda or caustic potash. Hydrogen is deposited at the cathode or negative electrode and oxygen at the anode or positive electrode. A particularly suitable electrolytic cell for the electrolysis of water is the bipolar or filter press type. This type of cell consists of a plurality of thin electrode plates separated by a porous diaphram, usually of asbestos, which separates the oxygen from the accompanying hydrogen produced at the electrodes. Electrolyte is continuously supplied to each of the electrodes to replenish the solution consumed by electrolysis and to maintain the electrolyte an optimum concentration, i.e., between about 15 to about 45 percent potassium or sodium hydroxide. The hydrogen and oxygen gas produced by the electrolytic cell escape freely from the backside of the electrodes and are evolved into the electrolyte solution and are thereafter disentrained from the electrolyte solution by suitable separation procedures.

Electrolytic cells of this type are highly advantageous as they are of a relatively compact structure and require less space for an equivalent productive capacity especially when compared to the tank type electrolytic cell.

The rate of production of hydrogen and oxygen in the electrolytic cell is directly proportional to the density of the current flowing through the aqueous electrolyte in the cell. For a given current density, the power requirement for the cell will depend upon the voltage required to cause this current to flow through the aqueous electrolyte. Any factor which decreases the voltage requirement will decrease the specific power requirement for the cell and increase its operating efficiency.

In accordance with the present invention, there is provided a bipolar electrolysis cell having improved operating efficiency which comprises a pair of porous electrodes, an electrolyte matrix saturated with aqueous electrolyte situated between the electrodes, the porous and in contact with a foraminous noble metal substrate such as a platinum or palladium gauze of fine mesh. Electrolyte is supplied to the electrolysis cell from electrolyte chambers adjacent to the porous electrodes.

The figure illustrates, in schematic cross section one embodiment of a unit cell of the present invention.

Referring now to the accompanying figure, the cell 10 comprises a pair of gas permeable electrodes, cathode 11 and anode 12, connected to a source of D.C. power supply 13 by leads 14 and 15. Electrolyte matrix 16 is situated between the cathode 11 and anode 12. Between and in contact with each electrode and opposite sides of the electrolyte matrix is located foraminous noble metal subtrates 17, 18, suitably a screen of the noble metal. The relative thickness of the electrodes 11, 12, the matrix 16 and the porous platinum substrates 17, 18 in the figure have been exaggerated for the purposes of clarity in the description. Actually in the preferred form, the electrodes, electrolyte matrix and foraminous noble metal substrates may be but a few mils in thickness, the dimension not being critical. The electrodes 11, 12, the electrode matrix 16 and the foraminous noble metal substrates 17 and 18 are supported in housing 19. Housing 19 also forms electrolyte chambers 20, 21 with perforated support columns 22 and 23. The perforations in the support columns 22, 23 permit electrolyte solution to be supplied to the porous electrodes and allow gas generated at the electrodes to enter the electrolyte chambers. The housing 19 and support columns 22 and 23 may be formed of any substantially chemically inert, water and gas impervious material, for instance, polytetrafluroethylene, polyvinyl chloride and the like. Aqueous electrolyte is contained in the electrolyte chambers 20, 21. Gas generated at the electrodes becomes disengaged from the electrolyte solution and escapes into the gas space 24, 25 above the electrolyte solutions in electrolyte chambers 20, 21 and is passed via conduits 27, 28 to suitable storage means 29, 30. Water consumed by electrolysis is replaced by means of water storage means 31, 32 from which water is fed in controlled amounts to the electrolyte chambers 20, 21. Valves 33, 34 regulate the addition of water to the electrolyte chambers at a rate determined to replace the water consumed by electrolysis.

The electrodes used in the electrolysis cell of the present invention must be porous so that the gas products produces thereon may be removed therefrom and allow fresh electrolyte solution to diffuse through the electrolyte matrix. Preferably, the electrodes employed in the electrolysis cells of the present invention are sintered nickel electrodes having a porosity of about 80 percent.

The foraminous noble metal substrate interposed between and in contact with the electrode surfaces and opposite surfaces of the electrolyte matrix may be a fine mesh screen or gauze composed of the noble metal. Suitable noble metals include patinum, palladium, rhodium and iridium and the like metal members of Group VIII of the Periodic Table.

The electrolyte matrix is preferably a fibrous material having a high capillary potential higher than either electrode 11 or 12, preferably in excess of 100 lbs./in.$^2$. Such electrodes and the electrolyte matrix being separated by fibrous material can be spun fibrous polypropylene, or asbestos, asbestos being the preferred fibrous material.

Suitable electrolytes which may be employed in the electrolysis cells of the present invention include the aqueous solutions of inorganic acids such as sulfuric acid, or bases such as alkali hydroxides, and their salts.

Concentrations of electrolyte vary according to the specific electrolyte employed. Electrolyte solutions containing 15 to 45 percent by weight of an alkali hydroxide such as sodium or potassium hydroxide are preferred.

The electrolysis cells may be operated at temperatures ranging from 100° to 200° F. Operating temperatures of 100° to 180° F. are preferred when electrolyte solutions containing alkali hydroxides are employed.

As is obvious to one skilled in the art, a multi-cellular apparatus comprised of a plurality of the unit cells of the present invention may be connected in series to form a module or stack of cells and in commercial applications a module is preferred for efficient application.

To illustrate the manner in which the invention may be carried out the following example is given.

An electrolysis cell of the type illustrated in the figure was employed for the production of hydrogen and oxygen. The electrodes of the cell were porous sintered nickel electrodes 0.030 inch thick having a 80 percent porosity and an apparent surface area of 0.25 in.$^2$. An asbestos fiber mat 0.020 inch thick of substantially the same size as the electrodes saturated with 35 percent KOH solution was employed as the electrolyte matrix. Separating each of the electrodes from the asbestos matrix and in contact with one surface of the electrodes and opposite surfaces of the asbestos matrix was interdisposed a 0.010 inch thick 50 mesh platinum screen. The electrodes, platinum screens and asbestos matrix were compressed tightly together to form the cell. Electrolyte solution supplied to chambers adjacent to the electrodes were electrolyzed by impressing a D.C. voltage across the two electrodes, utilizing a conventional D.C. power supply. The working voltages corresponding to current densities ranging from 576 to 9216 amps/ft.$^2$ (a.s.f.) were measured at a temperature of 100° F. and are recorded in the table below (second column of table).

For purposes of contrast, the electrolysis was repeated in a second series of electrode measurements after the platinum screen was removed from the cell.

For purposes of further contrast, the electrolysis was repeated in a third series of electrode measurements after the platinum screen and nickel electrodes were replaced with sintered porous electrodes catalyzed with a deposit of 20 mg./in.$^2$ of platinum black and 20 mg./in.$^2$ of palladium black of electrode surface.

For purposes of still further contrast, the electrolysis was repeated in a fourth series of electrode measurements after the platinum screen was replaced with a 0.020 inch thick 30 mesh nickel screen.

TABLE

| | Working cell voltage (volts) | | | |
|---|---|---|---|---|
| 1 | 2 | 3 | 4 | 5 |
| Current density (amps./ft.$^2$) | Platinum screened cell | No Pt screen in cell | Pd/Pt catalyzed Ni electrodes | Ni screened cell |
| 576 | 2.20 | 2.70 | 2.25 | 2.80 |
| 1,152 | 2.65 | 3.17 | 2.70 | 3.55 |
| 1,718 | 2.90 | 3.50 | 3.12 | 4.00 |
| 2,304 | 3.15 | 3.72 | 3.82 | 4.4 |
| 2,880 | 3.30 | 3.98 | 4.22 | 4.6 |
| 3,456 | 3.40 | 4.22 | 4.50 | 4.7 |
| 4,032 | 3.50 | 4.40 | 4.65 | 4.9 |
| 4,608 | 3.60 | 4.55 | 4.80 | 5.1 |
| 5,184 | 3.60 | 4.70 | 4.90 | 5.3 |
| 5,760 | 3.7 | 4.80 | 4.97 | 5.65 |
| 6,912 | 3.8 | | 5.2 | |
| 8,064 | 3.95 | | 5.5 | |
| 9,216 | 4.3 | | 5.75 | |

The working voltages of the control cells employed in the second, third and fourth series of electrode measurements at varying current densities are recorded in columns 3, 4 and 5 respectively of the table.

By referring to the above table, it is at once apparent that the electrolysis cells of the present invention (column 2 of the table) operate at substantially reduced voltages over equivalent control cells (columns 3–5 of the table) in which a platinum screen was not interposed between the porous electrodes and the electrolyte matrix. Such a reduction in the voltage for the cell represents a material reduction in the power consumption for the cell at a given current density and by consequence an increase in the operating efficiency of the cell.

The embodiments of the invention in which an exclusive property or privilege is claimed are defined as follows:

1. An electrolysis cell for the production of hydrogen and oxygen by the electrolysis of water comprising a container, a porous plate anode and cathode therein, a porous electrolyte matrix between said anode and cathode, a noble metal screen substrate interposed between and in contact with the anode and cathode surfaces and opposite surfaces of the electrolyte matrix, means for passing aqueous electrolyte into said porous anode and cathode, means for passing a direct electric current between said anode and cathode and means for collecting hydrogen and oxygen gas produced by the cell.

2. The cell of claim 1 wherein the noble metal substrate is platinum.

3. The cell of claim 1 wherein the porous anode and cathode is a sintered porous nickel electrode.

4. The cell of claim 1 wherein the noble metal substrate is a platinum screen of fine mesh.

5. The cell of claim 1 wherein the electrolyte matrix is comprised of asbestos fiber.

6. The cell of claim 1 wherein the noble metal is from the group consisting of palladium, rhodium and iridium gauzes of fine mesh.

References Cited

UNITED STATES PATENTS 3,382,167    5/1968    Lord et al. _____ 204—29 XR

JOHN H. MACK, *Primary Examiner.*

D. R. VALENTINE, *Assistant Examiner.*

U.S. Cl. X.R.

204—129, 283